(12) United States Patent
Peterson (10) Patent No.: US 10,938,900 B1
(45) Date of Patent: Mar. 2, 2021

(54) SOFTWARE DEFINED STORAGE DEFRAGMENTATION

(71) Applicant: EMC Corporation, Hopkinton, MA (US)

(72) Inventor: Ryan Peterson, Discovery Bay, CA (US)

(73) Assignee: EMC IP HOLDING COMPANY LLC, Hopkinton, MA (US)

(*) Notice: Subject to any disclaimer, the term of this patent is extended or adjusted under 35 U.S.C. 154(b) by 128 days.

(21) Appl. No.: 14/974,172

(22) Filed: Dec. 18, 2015

(51) Int. Cl.
*H04L 29/08* (2006.01)
*G06F 3/06* (2006.01)

(52) U.S. Cl.
CPC .......... *H04L 67/1097* (2013.01); *G06F 3/067* (2013.01); *G06F 3/0608* (2013.01); *G06F 3/0647* (2013.01)

(58) Field of Classification Search
CPC ... H04L 67/1097; G06F 3/0647; G06F 3/067; G06F 3/0629; G06F 3/0607; G06F 3/0683; G06F 3/0608
USPC ......................................................... 709/217
See application file for complete search history.

(56) References Cited

U.S. PATENT DOCUMENTS

| | | | | |
|---|---|---|---|---|
| 6,381,619 B1* | 4/2002 | Borowsky | ......... | G06F 17/30289 707/812 |
| 8,261,033 B1* | 9/2012 | Slik | ......... | G06F 3/067 711/111 |
| 8,874,749 B1* | 10/2014 | Vittal | ......... | G06F 9/5077 709/226 |
| 9,336,030 B1* | 5/2016 | Marr | ......... | G06F 9/45533 |
| 2006/0206662 A1* | 9/2006 | Ludwig | ......... | G06F 3/0607 711/114 |
| 2009/0063753 A1* | 3/2009 | Dow | ......... | G06F 8/61 711/6 |
| 2010/0250744 A1* | 9/2010 | Hadad | ......... | G06F 9/4856 709/226 |
| 2016/0103699 A1* | 4/2016 | Thakkar | ......... | G06F 9/45558 718/1 |
| 2017/0286146 A1* | 10/2017 | Voigt | ......... | G06F 9/50 |
| 2017/0371717 A1* | 12/2017 | Kiess | ......... | G06F 9/5077 |

* cited by examiner

*Primary Examiner* — Nam T Tran
*Assistant Examiner* — Lam H Duong
(74) *Attorney, Agent, or Firm* — Workman Nydegger (57) ABSTRACT

Defragmenting a software defined storage (SDS) system. To defragment an SDS system, the nodes associated with the SDS system are all moved to as to be close in terms of location. This may include de-provisioning nodes, provisioning nodes, and moving nodes as necessary. Multiple SDS systems can be defragmented at the same time.

19 Claims, 4 Drawing Sheets

SOFTWARE DEFINED STORAGE DEFRAGMENTATION

FIELD OF THE INVENTION

Embodiments of the invention relate to software defined storage (SDS) systems. More particularly, embodiments of the invention relate to systems and methods for organizing SDS systems including defragmenting SDS systems.

BACKGROUND

Software defined storage systems include a storage infrastructure that is managed by software. SDS systems effectively separate the storage hardware from the software. This has the benefit allowing the hardware to be abstracted. As a result, entities that have or that operate SDS systems do not need to be as concerned about the interoperability of the underlying storage hardware.

SDS systems come in a variety of configurations and can be deployed in different environments. SDS systems can be implemented for direct attached storage (DAS) devices, Storage Area Networks (SAN) devices, cloud-based storage, network attached storage (NAS), or the like (generally stored as blocks, files, objects, or key-value pairs). Examples of SDS systems include, but are not limited to, EMC Elastic Cloud Storage, EMC SCALEIO, and EMC ISILON, Qumulo, CleverSaft, Lustre, VMWARE. Each of these systems may be implemented in different computing environments.

SDS systems provide scalable storage for structured and unstructured data and can be optimized to take advantage of hardware efficiencies. SDS systems for cloud-based storage (whether public or private) may be configured differently from SDS systems for NAS storage or DAS storage. SDS systems and/or the associated storage can also be virtualized or containerized (such as by using Docker containers).

Notwithstanding these advantages, SDS systems can still be improved. For example, storage requirements usually increase over time and SDS systems are often configured to be scalable. Thus, nodes can be added to the SDS system as needed. Over time, however, the nodes of the SDS system can become dispersed such that the nodes of the SDS system are not close to each other. Systems and methods are needed to improve the performance of SDS systems and to allow the nodes to be organized.

BRIEF DESCRIPTION OF THE DRAWINGS

In order to describe the manner in which at least some aspects of this disclosure can be obtained, a more particular description will be rendered by reference to specific embodiments thereof which are illustrated in the appended drawings. Understanding that these drawings depict only example embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Embodiments of the present invention relate to software defined storage (SDS) systems. Embodiments of the invention further relate to improving the performance of SDS systems. Performance can be improved, in one example, by defragmenting the nodes included in or associated with the SDS systems.

SDS systems of multiple types may be deployed in a computing environment. Multiple SDS systems can be defragmented at the same time. SDS systems, for example, may store data differently (block, file, object, key-value pair, container, or the like).

A typical SDS system may include server nodes, which may be mounted on a rack. The nodes of an SDS system may also be organized as a cluster and provide the benefits of cluster architecture. The server nodes are each associated with storage or memory of some type. Some nodes may have faster performance than other nodes. The nodes associated with SDS systems can exist side by side in the computing environment. For example, a particular rack may have server nodes associated with an SDS system A and server nodes associated with SDS system B. If the SDS system A has nodes on another rack, then the server nodes are fragmented from a rack perspective (although not necessarily from a row or data center perspective).

Embodiments of the invention can defragment the SDS system A by consolidating all of the nodes associated with the SDS system A on the same rack. If the number of nodes is larger than the capacity of the rack, then the nodes can be consolidated on the same set or racks. If the SDS system A is being defragmented on a different scale (e.g., data center row, or data center), then it may be sufficient to consolidate all nodes to the same row or same data center.

Even if an SDS system is defragmented when initialized, the configuration of the SDS system can change over time. For example, SDS systems can be configured to respond dynamically to storage needs. As a result, nodes may be added to or removed from the SDS cluster. Because nodes located on the rack (or other level) may already be in use when the storage is added, the new node may not be close to the other nodes of the SDS system. As a result, the SDS system can become fragmented over time.

For example, a new node may be added on a different rack or zone. As a result of this process, a cluster of nodes associated with the same SDS system may be located in different locations (e.g., racks, rows, etc.)

Embodiments of the invention organize the storage pool or the nodes such that the nodes are close in terms of location. The location of the nodes can vary. For example, nodes can be defragmented on a node level, rack level, a row level, a data center level, or the like. Thus, close in terms of location may depend on the level of defragmentation being performed (node level, rack level, row level, etc.). For example, when defragmenting an SDS system at a rack level requires the nodes to be placed on the same rack or same set of racks.

Organizing the nodes in this manner may also ensure that the nodes are near to each other in terms of location. The nodes of an SDS system may also be defragmented in terms of network switches. The nodes may be defragmented such that they are associated with or accessible through the same switches or set of switches. An example might be a top of rack switch commonly found in data center design.

When organized in the context of a cluster, intra-cluster operations are also improved due to the nearness of the nodes. Embodiments of the invention defragment the nodes of an SDS system such that like nodes are close to each other.

In one example, performance may be improved by re-organizing the hardware or nodes associated with the SDS systems. More specifically, the nodes of an SDS system can be relocated to a specific location. In one embodiment, this may include provisioning a new node that is in an appropriate location (e.g., on the same rack as other nodes) and de-provisioning the node that is not in an appropriate location (e.g., not on the rack). Although reference is made herein to moving or relocating nodes, it is appreciated that the physical nodes may not actually be moved in one example. Rather, the nodes are de-provisioned and/or re-provisioned as necessary. A new node may also be provisioned. This may occur when a currently unused node is brought online. Stated differently, during defragmentation, a node associated with one SDS system may be reconfigured or re-provisioned to be associated with a different SDS system.

SDS systems can be implemented in computing environments such as a data center, a network (including a local area network) or the like. SDS systems can accommodate a large number of nodes. An SDS system may include one node or thousands of nodes. The computing environment may include more than one type of SDS system.

Figure 1:
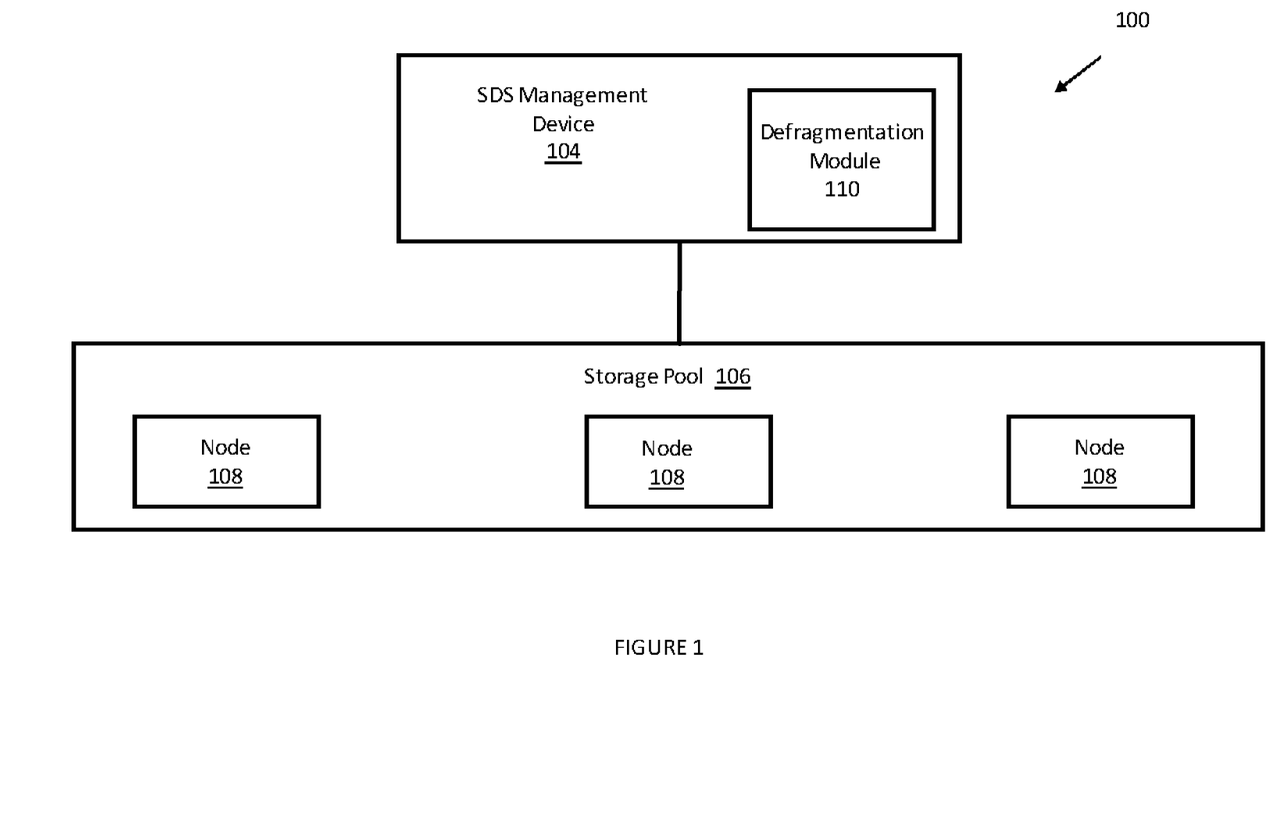
FIG. 1 illustrates an example of an SDS system that includes a defragmentation module.

FIG. 1 illustrates an example of an SDS system in a computing environment 100. The SDS system may include an SDS management device 104 and a storage pool 106. The SDS management device 104 may include software that may be implemented on one of the nodes of the SDS system. The SDS management device 104 may be a dedicated appliance or server. A given SDS system may include more than one management device. The SDS management device 104 may be accessible over the Internet, over a local network, or the like. The SDS management device 104 is configured to manage the storage pool 106. The SDS management device 104 (which may also be implemented as a software layer) is configured to determine how and where data is stored in the storage pool 106. In one example, the SDS management device 104 includes software that effectively separates storage related tasks from the hardware itself.

In one example, the defragmentation module may communicate with multiple SDS systems or with the nodes of multiple SDS systems using an appropriate application programming interface (API). Using the API, the defragmentation module or managing SDS system can determine the location of the nodes, initiate migration processes and defragment the SDS systems. A corresponding defragmentation component may be implemented on each SDS node in one example. This allows the defragmentation module to communicate with each node in each SDS system.

The storage pool 106 includes multiple nodes (e.g., commodity hardware) that may be rack mounted. Some of the nodes in the storage pool 106 may be associated with a different SDS system or may be an idle node. The nodes of the SDS system managed by the SDS management device 104 can be defragmented so as to be close to each other at least in terms of location and/or switches.

The SDS management device 104 may include a defragmentation module 110. The defragmentation module 110 is configured to generate a plan for performing the defragmentation process. This may include determining how the nodes are currently arranged, and then planning on how to move the various nodes so that the SDS systems can be defragmented. The defragmentation module 110 may need to account for the processor, memory, and other characteristics of each node because the nodes may not be identically configured. This may result in a situation where the defragmentation process increases or decreases the number of nodes needed in the SDS system. The defragmentation module 110 may cooperate with the defragmentation modules 110 of other SDS systems. Alternatively, the defragmentation module 110 can be able to determine the layout of all nodes or clusters and direct the rearrangement of these clusters.

In operation, data requests (e.g., reads, writes, deletes, copy, move, etc.) are received by the SDS system and more particularly by the nodes of the SDS system. The data requests, depending on the configuration of the SDS system, may include local data requests and/or remote data requests (e.g., requests over the Internet). Generally, clients access the SDS systems make a request to connect to the SDS systems and the management system (e.g., the storage management device 104, may provide a path for connecting the client with the storage pool 106. For example, a data request may be directed to a specific node 108 within the storage pool 106.

Each node may include storage of some type, but the nodes are not required to have the same type of storage. Thus, some nodes may provide SDS storage while other nodes may provide hard disk or magnetic based storage. This allows, in one example, an SDS system to provide tiered storage.

The SDS management device 104 may be configured to determine how the storage associated with the nodes 108 included in the storage pool 106 is used. When necessary, nodes can be reorganized (e.g., defragmented), added, or removed from the SDS system. Adding a node may include provisioning a new node or re-provisioning a node that is currently in service. Nodes can be reorganized or defragmented using a migration process (e.g., cluster node migration). When the storage pool 106 is reorganized or defragmented, the process may include adding, removing, and/or migrating nodes.

When multiple SDS systems are present, defragmenting nodes may require a more complex migration process and may require another node. In other words, migrating one node to a particular rack may also include migrating a node already on the rack to yet another rack. As a result, the defragmentation process may require an understanding of the computing environment and a plan prior to performing the defragmentation process such that no SDS system loses data.

Figure 2:
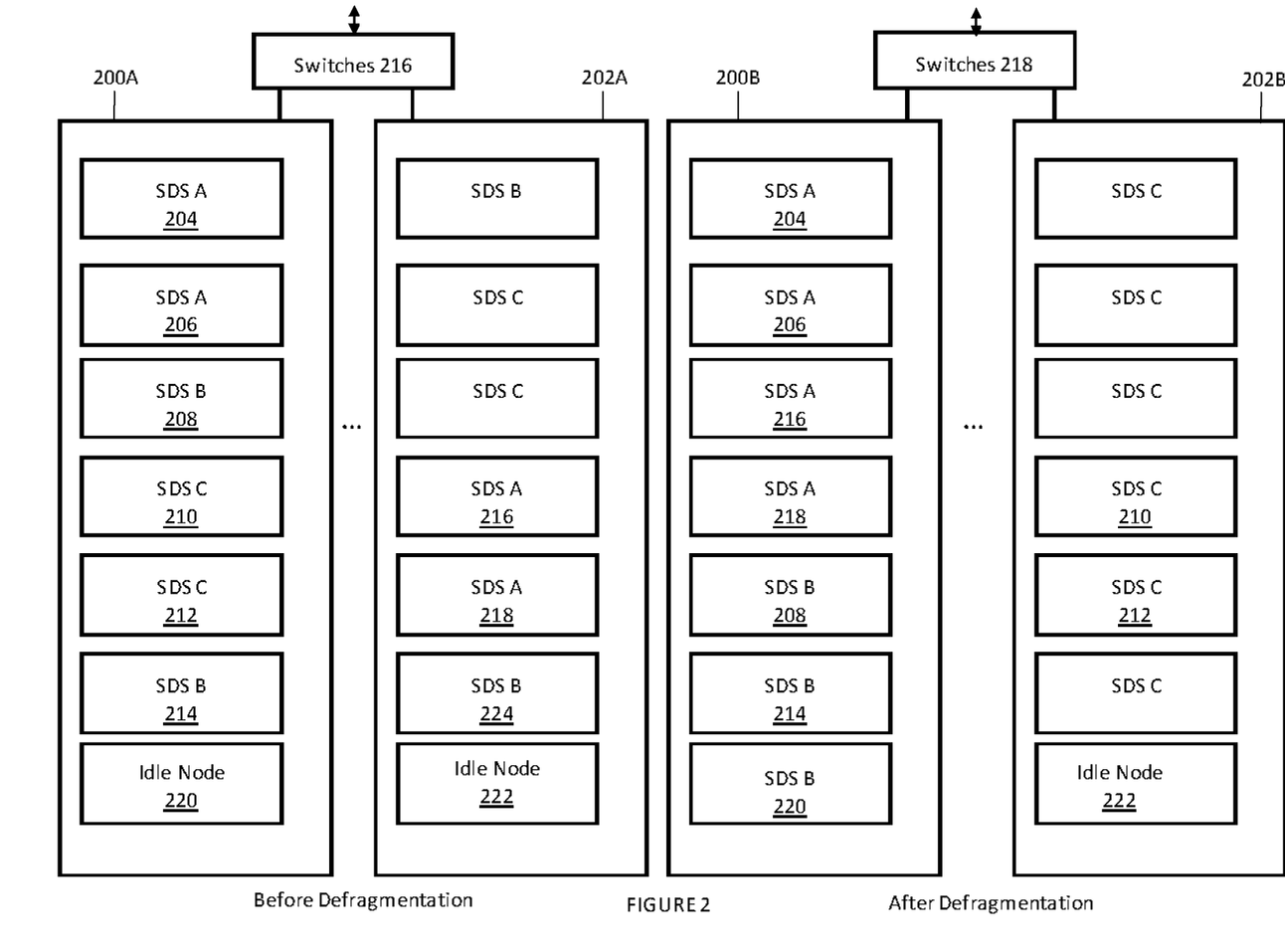
FIG. 2 illustrates nodes that are associated with multiple SDS systems and illustrates a process for defragmenting the SDS systems by relocating some of the nodes.

FIG. 2 illustrates an example of a computing environment that supports multiple SDS systems and illustrates a SDS defragmentation process. FIG. 2 illustrates a group of racks, represented by racks 200A and 202A prior to SDS defragmentation. FIG. 2 further illustrates the same racks (referred to as racks 200B and 202B) in a defragmented state. In some examples, racks 200A and 200B may be referred to as the rack 200 and racks 202A and 202B may be referred to as the rack 202. Thus, racks 200A and 200B are the same rack 200 at different points in time. Similarly, racks 202A and 202B are the same rack 202 at different points in time. Further, racks 200A and 202A represent the SDS systems in a fragmented state while racks 200B and 202B represent the SDS systems in a defragmented state. Generally, SDS defragmentation rearranges the nodes such that nodes associated with the same SDS system are grouped closely together.

Prior to defragmentation, the rack 200A is associated with a plurality of nodes. The rack 200A includes nodes 204, 206, 208, 210, 212, and 214. The rack 200A may also include offline or idle nodes that are not presently in use, such as the idle node 220. In the fragmented stated, the nodes 204, 206, 208, 210, 212, and 214 may be associated with different SDS systems. The nodes 204, 206 are associated with an SDS system A, the nodes 208 and 214 are associated with an SDS system B, and the nodes 210 and 212 are associated with an SDS system C. The rack 202A similarly includes nodes that are associated with different SDS systems. Each node may be part of a cluster. Each node may be a server node.

When the defragmentation process is performed the nodes associated with a particular SDS system are moved to the same location where possible. In this example, location may refer to the same zone. A zone may be, by way of example only a rack, the same group of racks, the same computing environment or network, the same data center, the same row of a data center or the like. Because SDS systems can include a large number of nodes, the location or nearness of one node to another node may depend on the extent to which defragmentation is performed. Defragmentation performed at a rack level indicates that nodes are defragmented such that the nodes of a particular SDS system are on the same rack to the extent possible. If there are more nodes than spaces in the rack, then nearness may extend to the adjacent rack or to a set of racks. If nodes are being defragmented on a different scale or level (e.g., row of data center), then nearness may depend on the level.

In FIG. 2, the SDS system A is defragmented by moving the nodes associated with the SDS system A to the rack 200B. Some nodes located on the rack 200B and associated with a particular SDS system may not be moved, but may be reallocated. Similarly, the nodes associated with the SDS system C are moved to the rack 202B in order to defragment the SDS system C. Nodes associated with other SDS systems may be similarly moved. FIG. 2 also illustrates an example in which the defragmentation process may move the nodes of different SDS systems to the same rack. The rack 200B, for example, includes nodes associated with the SDS system A and with the SDS system B.

During the defragmentation process, it may be necessary to involve another node. For example, if the node 210 and the node 216 were switched, this process may involve migrating one of the nodes to a third node such as 220 or 222 so that the change can be accomplished.

When the defragmentation process is performed, the nodes 204 and 206 are not moved by the defragmentation process in this example. This is illustrated in FIG. 2 because the nodes 204 and 206 remain on the same rack 200 during the defragmentation process. However, the node 216 and the node 218 are moved to the rack 200B. As previously stated, the physical nodes themselves (or hardware) are not migrated to the rack 200B. Rather, the nodes are de-provisioned and/or re-provisioned and/or migrated as necessary such that the SDS systems become defragmented.

The SDS systems A and B are defragmented on the rack 200B and the defragmentation process may be performed as follows. The nodes 204 and 206 are not moved. The node 216 takes the place of the node 208. The node 218 takes the place of node 210. The node 208 takes the place of the node 212 (thus the node 208 may be reallocated or migrated on the same rack 200). Further, when the SDS systems are being defragmented at the rack level, the node 208 may not need to be moved or reallocated in this example. The nodes of the SDS systems A and B can be mixed up and still be defragmented at the rack level. However, the rack 200B shows that the nodes of the SDS systems A and B are grouped together. In this example, the node 208 was migrated within the rack 200.

More specifically, the nodes 210 and 212 (which are not associated with the SDS system A when the defragmentation process begins) are de-provisioned and then re-provisioned with data corresponding to the SDS system A or the SDS system B. This process may include migrating the node 210 to an unused node, such as the node 220 or to the node 222. Then, the node 216 is then migrated to the rack 200B. Then, the node 216 (which is at one of the node 220 or the node 222), which is associated with the SDS system C, is migrated to the rack 202B. Similarly, the node 212 may be migrated directly to the rack 202B directly or via another idle node. By following this process, all of the nodes associated with the SDS system A, for example, can be located on the same rack (or, by way of example, group of racks, row or data center). More generally, the nodes can be migrated to the same zone.

The defragmentation process may require the defragmentation module to obtain an understanding of the layout of the racks 200A and 202A. In this example, the defragmentation module 110 may first scan the racks to identify which nodes are located where. This information allows a plan to be generated such that nodes can be migrated or provisioned as necessary to defragment the SDS systems. Once the plan is formulated, the defragmentation process is performed. The defragmentation process can be performed in parts, at low use times, or the like.

After the nodes have been de-provisioned and re-provisioned in this manner, the nodes associated with the SDS systems are defragmented as shown by the racks 200B and 202B. The racks 200B and 202B may also include offline or idle nodes.

Figure 3:
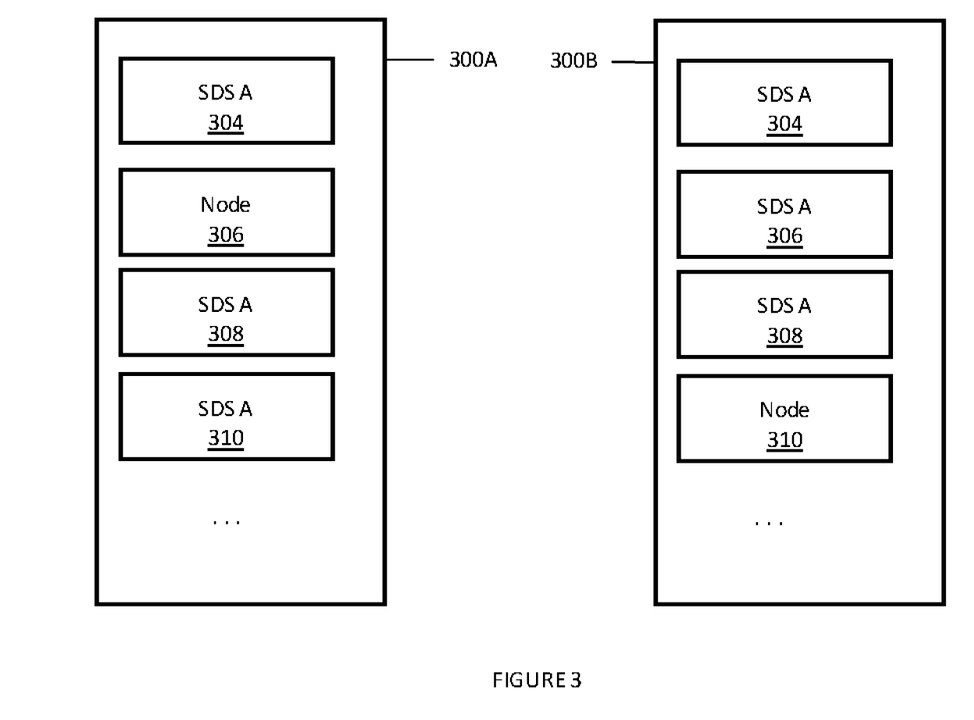
FIG. 3 illustrates examples of defragmented SDS systems.

FIG. 3 illustrates a rack 300 in two different defragmented states: rack 300A and rack 300B. The rack 300A illustrates that the nodes associated with the SDS A system are not contiguous. An unused node 306 is present between the node 304 and the node 308 while the nodes 308 and 310 are immediately adjacent to each other. The rack 300B illustrates that the nodes 304, 306, and 308 are all immediately adjacent to each other or contiguous. The unused node 310 is placed to come after the last node used by the SDS system A. In the rack 300A, the node 306 may be the next node provisioned for the SDS system A. In the rack 300B, the node 310 may be the next node provisioned for the SDS system A. In addition, as previously stated, a particular zone (e.g., the rack 300A or 300 B may include two or more defragmented SDS systems.

Figure 4:
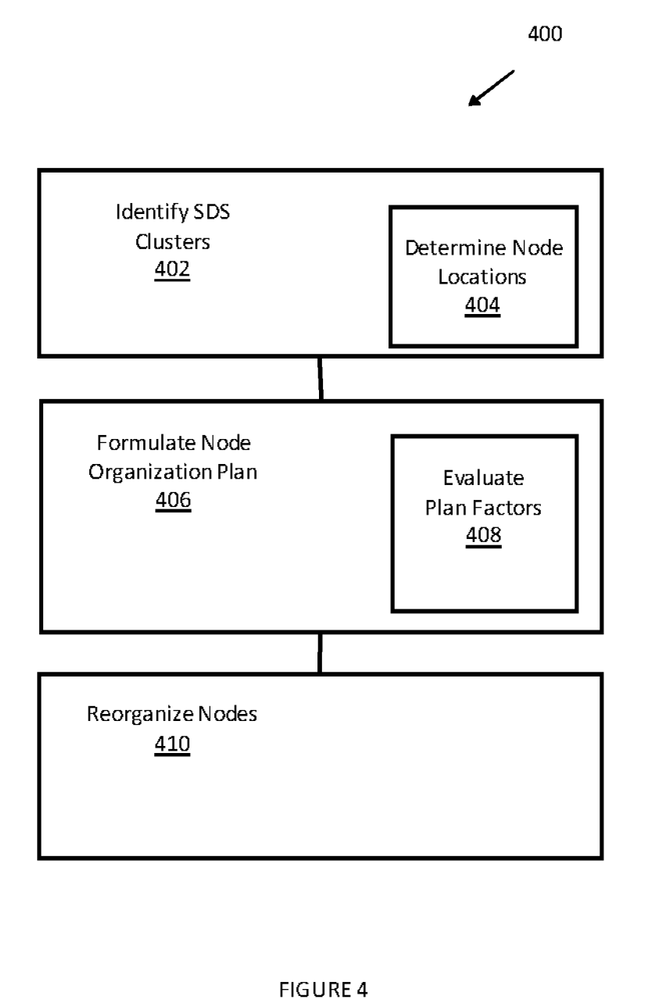
FIG. 4 illustrates an example method for defragmenting an SDS system.

FIG. 4 illustrates an example of a method 400 for defragmenting an SDS system. In one example, SDS systems may be organized in clusters as previously stated. Before defragmenting the SDS system, the cluster of the SDS system being defragmented or the clusters of the SDS systems being simultaneously defragmented are identified in box 402. This may include identifying each of the nodes that corresponds to each SDS system.

After the clusters or nodes are identified, it may be necessary to determine their specific locations in box 404. In one example, determining a location may include identifying a specific location of the physical node. Determining a location may also include identifying the node on which a virtual node or containerized node is installed, the rack on which the node is located, the row of a data center, the data center, or the like. The location information is then used during the defragmentation process to relocate or move nodes as discussed herein.

Typically, the defragmentation process is performed such that the nodes associated with a particular SDS system are sufficiently close for the level at which defragmentation is being performed. Defragmenting the nodes at a rack level suggests that the nodes are located on the same or adjacent racks. Nearness of nodes, in this example, corresponds to being on the same rack or adjacent racks or a specified set of racks even if not adjacent if there are too many nodes for one rack. In another example, when defragmentation is being performed on a different level (e.g., data center row), the nodes are defragmented and are sufficiently near in terms of location when on the same data center row.

Once the nodes are identified and located, a node organization plan is formulated in box 406. The plan to defragment the nodes may depend on various factors in box 408. For example, the defragmentation plan may consider the capacity of the nodes, how many nodes at a particular location (e.g., rack) are already in use, the storage capacity of a particular rack, the type of storage of the nodes on a rack, or the like. The number of racks may also be determined for a given SDS system. The capacity of the nodes is evaluated to ensure that the nodes on a particular rack have sufficient storage for the SDS system. The number of nodes may be evaluated to determine whether a particular rack can accommodate the nodes of a particular SDS system. In one example, especially where the number of nodes in an SDS system is larger than the number that can be supported by a rack, a defragmented rack may include nodes from more than one SDS system.

Formulating a node organization plan may include determining which nodes to move, which nodes are not going to be moved, how to move the nodes, or the like. The defragmenting process can be performed overtime. For example, the pace at which the defragmentation process is performed may depend on the load experienced by the SDS system. Alternatively, the defragmentation process may begin by adding nodes to the SDS system prior to defragmenting the nodes.

In box 410, the nodes are relocated by provisioning and de-provisioning the nodes in the computing environment as necessary. As previously stated, moving nodes may include any one of de-provisioning one or more nodes, provisioning one or more nodes, migrating one or more nodes, or the like or any combination thereof.

The nodes of the SDS systems discussed herein may be virtualized or containerized. Virtualized or containerized nodes can be migrated to other nodes in the computing environment.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein.

As indicated above, embodiments within the scope of the present invention also include computer storage media, which are physical media for carrying or having computer-executable instructions or data structures stored thereon. Such computer storage media can be any available physical media that can be accessed by a general purpose or special purpose computer.

By way of example, and not limitation, such computer storage media can comprise hardware such as solid state disk (SSD), RAM, ROM, EEPROM, CD-ROM, flash memory, phase-change memory ("PCM"), or other optical disk storage, magnetic disk storage or other magnetic storage devices, or any other hardware storage devices which can be used to store program code in the form of computer-executable instructions or data structures, which can be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' can refer to software objects or routines that execute on the computing system. The different components, modules, engines, and services described herein may be implemented as objects or processes that execute on the computing system, for example, as separate threads. While the system and methods described herein can be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention can be performed in client-server environments, whether network or local environments, or in any other suitable environment. Suitable operating environments for at least some embodiments of the invention include cloud computing environments where one or more of a client, server, or target virtual machine may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for defragmenting a plurality of software defined storage systems in a data center, the method comprising:

for each of the plurality of software defined storage systems and based on a type of storage provided by each of the software defined storage systems:
  identifying nodes of a software defined storage system, wherein the nodes includes server nodes that provide storage for the software defined storage system and wherein the software defined storage system provides a specific type of storage;
  identifying physical locations of the nodes associated with the nodes of the software defined storage system in the data center;
  formulating a plan to defragment the nodes to a particular physical location, wherein the particular physical location, prior to defragmentation, is associated with a plurality of nodes that includes some of the nodes belonging to the software defined storage system, nodes that belong to a different software defined storage system associated with a different type of storage, and/or idle nodes, wherein the plan accounts for a capacity of the nodes and a type of storage of the nodes at the particular physical location; and
  defragmenting the nodes by:
    deprovisioning all nodes of the software defined storage system in the data center that are not at the particular physical location;
    provisioning nodes at the particular physical location for the software defined storage system;
    deprovisioning the nodes that belong to the different software defined storage system at the particular physical location; and
    provisioning the nodes that belong to the different software defined storage system at another physical location associated with the different software defined storage system in order to accommodate the nodes associated with the software defined storage system being provisioned at the particular physical location.

2. The method of claim 1, wherein the particular physical location further corresponds to at least one of a node, a rack, a row of a datacenter, a datacenter, or a set of racks.

3. The method of claim 1, wherein formulating a plan includes at least one of determining a number of nodes at the particular physical location, determining the capacity of the nodes at the particular physical location, or identifying nodes to be removed from the particular physical location.

4. The method of claim 1, further comprising migrating all the nodes that are not at the particular physical location to other nodes at the particular physical location.

5. The method of claim 4, further comprising de-provisioning all the nodes that are not at the particular physical location after they have been migrated to the nodes at the particular physical location.

6. The method of claim 4, further comprising preparing nodes at the particular physical location by migrating nodes at the particular physical location that belong to the different software defined storage system.

7. The method of claim 6, further comprising migrating the nodes that are not at the particular physical location to the prepared nodes that have been migrated out of the particular physical location.

8. A method of defragmenting a software defined storage (SDS) system in a computing environment that includes a plurality of unrelated SDS systems that include the SDS system, the method comprising:
  for each of the plurality of unrelated SDS systems, wherein each of the plurality of unrelated SDS systems provides a specific type of storage and wherein at least some of the unrelated SDS systems provide different types of storage:
    determining a physical layout of nodes associated with the SDS system in the computing environment, wherein the nodes include server nodes that provide storage for the SDS systems and wherein the physical layout is associated with a first set of switches;
    generating a plan to re-organize the nodes associated with the SDS system providing the specific type of storage such that all the nodes are at a physical destination location that is associated with a particular switch or a second set of switches, wherein the plan accounts for a capacity of the nodes and a type of storage of the nodes at the physical destination location,
  the plan including:
    identifying a physical location of each of the nodes associated with the SDS system, wherein the physical location, prior to defragmentation, is associated with a plurality of nodes that includes nodes belonging to the SDS system and nodes that do not belong to the SDS system; and
    identifying a destination node for each of the nodes that are in the identified physical location; and
    defragmenting nodes in the computing system such that all nodes associated with the SDS system by:
      provisioning and de-provisioning nodes at the physical destination location, wherein at least some of the nodes of the SDS system are already present at the physical destination location and are not deprovisioned; and
      deprovisioning enough of the nodes in the physical destination location that belong to a different SDS system and provisioning the nodes that belong to the different SDS system at a location outside of the physical destination location such that the nodes being provisioned at the physical destination location are defragmented with respect to the different SDS system to which they belong.

9. The method of claim 8, wherein the location is at least one of a rack, a set of racks, a row in a data center, or a data center.

10. The method of claim 8, wherein re-organizing the nodes includes migrating the nodes that are fragmented with respect to the location to the destination nodes.

11. The method of claim 8, further comprising migrating nodes that are not associated with the SDS system out of the location.

12. The method of claim 8, wherein the provisioned nodes at the location are included in a cluster associated with the SDS system.

13. The method of claim 8, further wherein re-organizing the nodes comprises moving all of the nodes that are fragmented with respect to the location to the destination nodes.

14. The method of claim 8, wherein re-organizing the nodes includes at least one of migrating, provisioning, and de-provisioning the nodes in the computing environment such that all nodes associated with the SDS system are physically at the location.

15. A method for defragmenting multiple software defined storage (SDS) systems that are located in a computing environment, wherein the multiple SDS systems each include nodes that are mounted on racks in the computing environment, the method comprising:

determining, for each SDS system, a first set of switches that are associated with nodes associated with each SDS system, the nodes including server nodes that provide storage for the multiple SDS systems, wherein each SDS system provides a type of storage and at least some of the SDS systems provide different types of storage;

formulating a plan to re-organize the nodes associated with all of the SDS systems such that all nodes associated with each SDS system associated with the same type of storage are associated with a physical particular switch or a particular set of physical switches, wherein the particular physical switch or the particular set of physical switches are different for each of the multiple SDS systems, wherein formulating a plan includes identifying physical locations of each of the nodes for each of the multiple SDS systems;

defragmenting the nodes such that all nodes associated each of the SDS systems are associated with the corresponding particular physical switch or particular set of physical switches, wherein defragmenting the nodes includes provisioning nodes, de-provisioning nodes, and migrating nodes that do not belong to the SDS system being defragmented as necessary such that the nodes of each the SDS systems, respectfully, are associated with the same particular physical switch or particular set of physical switches.

16. The method of claim 15, wherein formulating a plan includes evaluating a capacity of each rack to ensure that the nodes on a particular rack can accommodate storage requires of a particular SDS system.

17. The method of claim 16, further comprising identifying a particular rack as a location for each SDS system.

18. The method of claim 15, wherein defragmenting the nodes further includes migrating some of the nodes to temporary nodes to facilitate defragmenting the nodes.

19. The method of claim 15, further comprising installing a defragmentation module on one of the nodes, wherein the defragmentation module controls defragmenting the nodes for at least one of the SDS systems.

\* \* \* \* \*